United States Patent [19]
Jaeger et al.

[11] Patent Number: 5,507,864
[45] Date of Patent: Apr. 16, 1996

[54] PHASE CHANGE INK COMPOSITION EMPLOYING A COMBINATION OF DYES

[75] Inventors: C. Wayne Jaeger, Beaverton; Loc V. Bui, Portland; Donald R. Titterington, Tualatin, all of Oreg.

[73] Assignee: Tektronix, Inc., Wilsonville, Oreg.

[21] Appl. No.: 338,072

[22] Filed: Nov. 14, 1994

[51] Int. Cl.$^6$ .......................... C09D 11/02; C09D 11/12
[52] U.S. Cl. .................. 106/22 A; 106/22 B; 106/22 H
[58] Field of Search ................................ 106/22 A, 22 H, 106/22 B

[56] References Cited

U.S. PATENT DOCUMENTS

| | | | |
|---|---|---|---|
| 3,653,932 | 4/1972 | Berry et al. | 106/31 R |
| 3,994,872 | 11/1976 | Kuster | 260/147 |
| 4,133,695 | 1/1979 | Wheeler et al. | 106/288 |
| 4,390,369 | 6/1983 | Merritt et al. | 106/31 R |
| 4,664,715 | 5/1987 | Jesse | 106/309 |
| 4,786,327 | 11/1988 | Wenzel et al. | 106/22 R |
| 4,830,671 | 5/1989 | Frihart et al. | 106/31 R |
| 4,889,560 | 12/1989 | Jaeger et al. | 106/27 R |
| 5,084,099 | 1/1992 | Jaeger et al. | 106/22 A |

*Primary Examiner*—Helene Klemanski
*Attorney, Agent, or Firm*—Ralph D'Alessandro

[57] ABSTRACT

The present invention preferably employs a phase change ink composition that includes a combination of different dye types such as an anthraquinone dye and a xanthene dye, which is most preferably a rhodamine dye. While each dye type is insufficiently soluble with respect to favored carrier compositions to preserve color saturation in reduced ink quantity prints, the dye type combination permits increased dye loading and maintains print quality. In a preferred embodiment of the invention, a favored carrier composition is adjusted to promote the colored form of a preferred rhodamine dye (C.I. Solvent Red 49) and mixed with a preferred anthraquinone dye (C.I. Solvent Red 172) whose concentration is kept below a critical level to prevent post printed blooming. The resulting preferred phase change ink compositions provide a magenta phase change ink with enhanced light fastness and color saturation, as well as good compatibility with preferred existing subtractive primary color phase change inks.

24 Claims, No Drawings

PHASE CHANGE INK COMPOSITION EMPLOYING A COMBINATION OF DYES

TECHNICAL FIELD

The present invention relates generally to phase change ink compositions, and more particularly to nonaqueous, phase change ink compositions employing a combination of dyes.

BACKGROUND OF THE INVENTION

In general, phase change inks are in the solid phase at ambient temperature, but exist in the liquid phase at an elevated operating temperature of an ink jet printing device. At the jet operating temperature, droplets of liquid ink are ejected from the printing device and, when the ink droplets contact the surface of the printing material, they quickly solidify to form a predetermined pattern of solidified ink drops.

Because phase change inks remain in a solid phase at room temperature, they facilitate shipping and long-term storage. Among other numerous advantages, these inks also largely eliminate nozzle-clogging problems caused by ink evaporation, and thereby improve the reliability of ink jet printing.

Phase change inks have been employed in both direct and transfer printing processes. A phase change ink composition is typically cast into solid ink sticks and placed into an ink jet printing device. Then, the temperature is raised to a first elevated operating temperature where a liquid phase with selective fluid properties is formed. The ink is then typically held as a liquid at this relatively high operating temperature in a reservoir and printhead of an ink jet printer.

The liquid phase ink composition can then be applied in a predetermined pattern onto a substrate. In transfer type printers, for example, the ink composition is deposited onto an intermediate transfer surface such as disclosed in U.S. patent application Ser. No. 07/981,646, filed Nov. 25, 1992, assigned to the assignee of the present invention, and herein incorporated by reference. The intermediate transfer surface is held at an intermediate temperature, which is below the melting point of the ink formation, but is above ambient temperature. At this intermediate temperature, the ink composition is maintained as a solid, but is malleable and has specified mechanical properties that enable it to be used in subsequent steps of the process.

The ink is then transferred in an "imagewise" or "pagewise" fashion to the final substrate by use of a pressure nip where the specified pressure is above the compressive yield strength of the solid, malleable ink at the intermediate temperature mentioned above. Preferably, the final receiving substrate or surface is heated to a temperature greater than the intermediate temperature before being fed into a nip where the substrate is brought into contact with the malleable ink droplets to form a desired image or pattern. During this transfer step, the ink droplets are flattened, spread, and in the case of paper substrates, fused into the substrate. The final step in the process is removal of the final substrate from the pressure nip and the separation of the substrate and ink layer from the intermediate transfer surface. During this step, the ink must retain enough cohesive strength to resist cohesive failure due to the tensile forces it experiences as it is peeled from the transfer surface. Thin films of uniform thickness of the phase change ink composition on the final receiving substrate when cooled to the ambient temperature must be ductile and retain sufficient flexibility so that the image will not fracture upon bending, while possessing a high degree of lightness, chroma, transparency, and thermal stability.

A phase change ink composition must have process compatible fluidic and mechanical properties in order to produce a printed substrate of high quality. Desirable properties of solid state phase change ink compositions are specified and measured by using several analytical techniques. One such technique is dynamic mechanical analyses (DMA), which measures the viscoelastic properties of a material by identifying the material's elastic and viscous components. The measurements are made by subjecting the ink composition to an alternating (oscillatory or dynamic) strain, and simultaneously measuring the alternating stresses and phase angles at different frequencies and temperatures. The dynamic stress (s*) of an ink composition can be separated into two components. There is the "elastic stress" component which is the magnitude of the portion of the applied force in phase with the applied strain, and the "viscous stress" component, which is the magnitude of the portion of the applied force out of phase with the applied strain. The dynamic modulus (E*) can be determined from the ratio of dynamic stress over strain. Correspondingly, it can be broken down into the in-phase component of the modulus, E', and the out-of-phase component of the modulus, E". E' defines the energy stored in a specimen under an applied strain. E' is determined by the equation E'=s./E. (Cos δ). E" defines the energy loss due to viscous dissipation under an applied strain. E" is determined by the equation E"=s./E. (Sin δ).

The phase angle (δ) is the lag in the measured stresses to an applied strain due to the viscoelastic nature of the material. The loss tangent (tan δ) is the ratio of loss modulus over storage modulus. Tan δ is often referred to as the dissipation (damping) factor, i.e., the ratio of energy dissipated per cycle to the maximum potential energy stored during a cycle. Finally, the glass transition temperature ($T_g$) is a temperature at which there is a large drop in modulus, about 0.5 to about 3 orders of magnitude, accompanied by a definite peak of the tan δ. Below the $T_g$, the material behaves like a brittle solid. At the $T_g$, the material acts as a leathery solid and is capable of dissipating energy. Above the $T_g$, the material is similar to a rubbery solid. Dynamic properties are usually plotted in terms of E', E" and tan δ as a function of temperature at a constant frequency or as a function of frequency at a constant temperature. Through the entitled, "Viscoelastic Properties of Polymers," Chapter 11, pages 264–320, 3rd Edition by John D. Ferry; it is understood that the effect of changing temperature will correspond to a shift along the frequency axis for all relaxation processes, without appreciable change in magnitude of all of these relaxation processes.

Another of the mechanical analytical techniques mentioned above is compressive yield testing on bulk samples of the phase change ink compositions. Yield stress is the point on the stress-strain curve at which the material continues to deform without an increase in stress. This is important in the printing process mentioned above since it determines the pressure needed to spread the solid, malleable ink droplets into a continuous thin film during the transfer process.

There are various types of deformation the ink undergoes in compression as a function of temperature or rate. An ink can be classified as being brittle if it fails by the shearing and fracturing of the molecular bonds. This is typified by low elongation (which is directly proportional to strain) and moderate to high stress. Since the integration of the area under the stress-strain curve is a measure of the toughness of the material, a brittle material is strong, but not tough. The brittle behavior is detrimental to the durability of the ink on substrates because it is both low in elongation (i.e., not very ductile or flexible) and toughness (i.e., the ability to dissipate energy).

An ink is considered to be ductile if it fails by sliding the molecules over each other and flowing. This is typified by high elongation and toughness. Ductile behavior is desirable for a printing process involving transfer and fusing or fixing because it allows the ink to spread by flowing under an applied pressure without fracturing.

Shear banding is the transition between the ductile and weak behavior, where the ink loses its cohesive strength. Shear bands are typified by 45° angle criss-crossed bands that indicate the ink is weakening. Weak behavior is characterized by the crumbling behavior of the ink. This is due to the loss in cohesive strength of the material. It is theorized that this occurs once short molecules have flowed past one another at high elongation. The weak behavior is to be avoided during the image transfer and fusing steps because it leads to poor durability of the ink on substrates, poor rectilinear light transmission of the ink, and poor transfer efficiency during printing.

Phase change inks typically include a phase change ink carder composition that is combined with a phase change ink compatible subtractive primary colorant. The subtractive primary colorants may, for example, comprise cyan, magenta, yellow, and black component dyes that are typically selected from either class of Color Index (C.I.) solvent dyes, dispersed dyes, modified acid and direct dyes, and a limited number of basic dyes.

The ingredients in phase change ink compositions are selected to achieve desirable print quality and process stability. Colorants or dyes are often selected for light fastness, as well as hue, brightness, thermal stability, rectilinear light transmissivity, co-compatibility, and other criteria. For example, fluorescent dyes tend to be bright but tend to complicate ink color matching, and are not tremendously light fast. Some xanthene dyes, such as certain rhodamine dyes, tend to be fluorescent, but somewhat light fast; however certain of these dyes undergo a facile rearrangement between two different structures, only one of which is colored. Anthraquinone dyes, on the other hand, are extremely stable to both heat and light but tend to migrate or separate from the ink compositions to form a layer of powdered dye on print surfaces. This phenomenon, called "blooming," may take considerable time to become evident and can ruin the color and aesthetic appearance of prints.

Carrier compositions are often selected for specific fluidic and mechanical properties such as those described in U.S. patent application Ser. No. 07/981,677, filed Nov. 25, 1992, assigned to assignee of the present application, and herein incorporated by reference. The composite phase change ink compositions must be compatible with a selected ink jet printing process, such as the above-described transfer printing process, while retaining the desired colorant characteristics. Exemplary phase change ink compositions, including colorants and carrier compositions, are disclosed in U.S. Pat. Nos. 4,889,560 and 5,084,099, which are herein incorporated by reference.

The printing industry is ceaselessly attempting to increase printing speed, increase the interval between ink reloading, decrease the cost per printed substrates, and reduce the size of ink jet printers (including printheads and reservoirs). One strategy for facilitating these improvements includes decreasing the amount or film thickness of phase change ink ejected from the printer and transferred to the substrate. Thinner ink films would also decrease the thickness of printed ink above the substrate surface, reducing the likelihood of abrasion or blocking.

However, ink reduction strategies impose even greater constraints on phase change ink compositions. If the printed ink quantity is halved, for example, then the colorant concentration in the ink composition must be substantially increased to maintain desirable printed color saturation. The limited solubility of many colorants in carrier compositions generally does not permit sufficient increase of the specific colorant concentration to satisfy printed color quality, including intensity.

It would therefore be advantageous to devise for selected printing applications an ink composition and method that facilitate a reduction in printed ink quantity and maintain color intensity.

SUMMARY OF THE INVENTION

The object of the invention is therefore to provide a phase change ink composition that employs a combination of dyes.

The present invention preferably employs a phase change ink composition that includes a combination of different dye types such as an anthraquinone dye and a xanthene dye. While each dye type is insufficiently soluble with respect to favored carder compositions to preserve color saturation in reduced ink quantity prints, the dye type combination permits increased dye loading and maintains print quality.

In a preferred embodiment of the invention, a favored carrier composition is adjusted to promote the colored form of a preferred rhodamine dye (C.I. Solvent Red 49) and mixed with a preferred anthraquinone dye (C.I. Solvent Red 172) whose concentration is kept below a critical level to prevent post printed blooming. The resulting preferred phase change ink composition provides a magenta phase change ink with enhanced light fastness and color saturation, as well as good compatibility with other preferred existing subtractive primary color phase change inks. The preferred magenta ink composition exhibits reduced fluorescence with respect to its rhodamine dye components and, therefore, facilitates color matching.

Additional objects and advantages of the present invention will be apparent from the following detailed description of a preferred embodiment thereof.

DETAILED DESCRIPTION OF A PREFERRED EMBODIMENT

This invention comprises phase change ink compositions preferably for use in a process by which such compositions are indirectly applied via an intermediate transfer surface to a final receiving surface or substrate. The phase change ink compositions include a phase change ink colorant composition and a phase change ink carder composition. The phase change ink carrier composition is formulated to produce an ink composition having fluidic and mechanical properties that meet the parameters required for transfer printing.

The base phase change ink carrier composition typically comprises a fatty amide-containing material, such as a tetra-amide compound. Preferred tetra-amide compounds are dimer acid-based tetra-amides that preferably include the reaction product of a fatty acid, a diamine (ethylene diamine), and a dimer acid. For purposes of this invention, the term "dimer acid" preferably means a hydrogenated oleic acid dimer product. A preferred example of such a dimer acid is a product known as Empol 1008 Dimer Acid, manufactured by the Emery Division of Henkel Corporation of Cincinnati, Ohio. Fatty acids having from 10 to 22 carbon atoms are preferably employed in the formation of the dimer acid-based tetra-amide. These dimer acid-based tetra-amides are produced by Union Camp and comprise the reaction product of ethylene diamine, dimer acid, and the following fatty acids: decanoic acid (Union Camp X3203-23), myristic acid (Union Camp X3202-56), stearic acid (Union Camp X3138-43, X3164-23, X3202-44, X3202-46, X3222-655, X3261-37, X3261-53, and X3290-72), and docosanoic acid (Union Camp X3202-36). For the purposes of this invention, the most preferred dimer acid-based tetra-amide is Unirez 2970, the reaction product of dimer acid, ethylene diamine and stearic acid in the stoichiometric ratio of 1:2:2. Stearic acid is the preferred fatty acid reactant because its adduct with dimer acid and ethylene diamine has the lowest viscosity of the dimer acid based tetra-amides. Its ingredients also are the most readily available and, therefore, lowest in cost.

The fatty amide-containing material can also comprise a mono-amide. A preferred phase change ink carrier composition comprises both a tetra-amide compound and a mono-amide compound. The mono-amide compound typically comprises either a primary or secondary mono-amide, but is preferably a secondary mono-amide. Of the primary mono-amides, stearamide, such as Kemamide S, manufactured by Witco Chemical Company, can be employed herein. As for the secondary mono-amides, behenyl behenamide (Kemamide EX-666), and stearyl stearamide (Kemamide S-180 and Kemamide EX-672), all manufactured by Witco Chemical Company, are extremely useful mono-amides. However, stearyl stearamide is the mono-amide of choice in producing the modified phase change ink carrier composition of the present invention.

Preferred fatty amide-containing compounds comprise a plurality of fatty amide materials that are compatible with each other. Typically, even when a plurality of fatty amide-containing compounds are employed to produce the phase change ink carder composition, the carrier composition has a substantially single melting point transition. The melting point of the phase change ink carder composition is preferably at least about 85° C.

A preferred phase change ink carder composition comprises a tetra-amide and a mono-amide. The weight ratio of the tetra-amide to the mono-amide in the preferred instance is from about 2:1 to about 1:10, and more preferably, from about 1:1 to about 1:3.

Various modifying agents can be added to a phase change ink carrier composition. However, only certain modifying agents will produce a phase change ink composition with the required properties that falls within the scope of this invention tier indirect application of the inks. For example, a preferred modifying agent includes certain tackifiers. The preferred tackifiers encompass those which are compatible with fatty amide-containing materials. These include, for example, Arakawa KE-311 Resin, a triglyceride of hydrogenated abietic (rosin) acid made by Arakawa Chemical Industries, Ltd., Foral 85, a glycerol ester of hydrogenated abietic (rosin) acid, Foral 105, a pentaerythritol ester of hydroabietic (rosin) acid, Cellolyn 21, a hydroabietic (rosin) alcohol ester of phthalic acid, all manufactured by Hercules Chemical Company, Nevtac 2300 and Nevtac 80, synthetic polyterpene resins manufactured by Neville Chemical Company, and Wingtack 86, a modified synthetic polyterpene resin manufactured by Goodyear Chemical Company. The most preferred tackifier, however, is Arakawa KE-311 Resin.

Another of the preferred modifying agents that can be added to the formulation are certain plasticizers. For instance, many of the phthalate ester plasticizers sold by Monsanto under the traded name "Santicizer" are suitable for this purpose. However, the preferred plasticizer is Santicizer 278, which is the mixed diester of phthalic acid with benzyl alcohol and "TEXANOL plasticizer".

Other additives may be combined with the phase change ink carrier composition. In a typical phase change ink chemical composition, antioxidants are added for preventing discoloration of the carrier composition. The preferred antioxidant materials can include IRGANOX 1010 antioxidant manufactured by Ciba Geigy; and NAUGARD 76, NAUGARD 445, NAUGARD 512, and NAUGARD 524, antioxidants manufactured by Uniroyal Chemical Company. However, the most preferred antioxidant is Naugard 445.

While the modifying agents mentioned above are used for the preferred embodiments of this invention, other materials with similar properties can be combined with or used to produce different phase change ink compositions with mechanical and fluidic properties similar to those outlined above. These other materials can include paraffins, microcrystalline waxes, polyethylene waxes, ester waxes, oligomers or low molecular weight polymers and copolymers such as EVA, ethylene/acrylic acid copolymers, EVA/acrylic acid copolymers, ionomers, copolymers of acrylic acid with polyamides, and the like.

In a preferred case, the phase change ink carrier composition comprises a tetra-amide and a mono-amide compound and a modifying agent that includes a tackifier, a plasticizer, and an antioxidant. The preferred compositional ranges of this phase change ink carrier composition are as follows: from about 10 to about 50 weight percent of a tetra-amide compound, from about 30 to about 80 weight percent of a mono-amide compound, from about 0 to about 40 weight percent of a tackifier, from about 0 to about 30 weight percent of a plasticizer, and about 0 to about 2 percent of an antioxidant.

Another important property of phase change inks is viscosity. The viscosity of the molten ink must be matched to the requirements of the ink jet device and optimized versus other physical properties of the ink. For purposes of this invention, the viscosity of the phase change ink is measured on a Ferranti-Shirley cone plate viscometer with a large cone. It is preferred that the viscosity of the phase change ink carrier composition at 140° C., and in turn the ink composition of this invention, is from about 5 to about 30 centipoise, more preferably from about 10 to about 20 centipoise, and most preferably from about 11 to about 15 centipoise.

The following examples of phase change ink compositions including a mixture of two different types of colorants, are presented to illustrate the scope of the invention and to be illustrative of the phase change ink formulations that can be successfully employed both with and without a liquid intermediate transfer surface, without any intent to limit the invention to the specific materials, process or structure employed.

The preferred embodiment employs a phase change ink composition that includes a combination of different dye types such as an anthraquinone dye and a xanthene dye, which is most preferably a rhodamine dye. While each dye type is insufficiently soluble with respect to favored carrier compositions to preserve color saturation in reduced ink quantity prints, the dye type combination permits increased dye loading and maintains print quality.

The preferred rhodamine dye, C.I. Solvent Red 49, undergoes a facile rearrangement between a colored and a noncolored form. The colored form is preferred in polar and/or acidic environments. In the preferred ink compositions of the present invention, the colored form of C.I. Solvent Red 49 was promoted by adjusting the preferred carrier compositions to include a high weight percent of Unirez 2970, preferably 25–55%.

EXAMPLE 1

A carrier composition (500 grams) was prepared from the following materials: 51% by-weight Kemamide S-180 (255 g), 32% Unirez 2970 (160 g), 13% Arakawa KE-311 Resin (65 g), 4% Santicizer 278 (20 g), and 0.2% NAUGARD 445 (1 g). The ingredients were melted together and heated overnight at 135° C.

A mixture of 1.46% (3.75 g) of BASF Neptun Red Base NB 543 (C.I. Solvent Red 49) and 0.88% (2.25 g) Morton Morplas Magenta 36 (C.I. Solvent Red 172) was added to 250 g of the above-described carrier composition. The dyes were stirred in the carrier composition for approximately 3 hours at 110° C. and then filtered (Mott filtration apparatus with a No. 3 Whatman filter at 110° C. with 15 psi of nitrogen). The resulting ink composition had a nonfluorescent chroma and was found to be compatible with subtractive primary color dyes and a favored black ink composition.

EXAMPLE 2

A phase change ink composition of 1000 grams was prepared as follows: 497.05 g of Kemamide S-180, 126.7 g of Arakawa KE-311 Resin, 39.00 g of Santicizer 278, and 1.90 g of NAUGARD 445 were mixed overnight at 110° C. Then, 311.87 g of Unirez 2970 was added slowly to the mixture at 110° C. Finally, the dyes, 17.50 g of BASF Neptun Red Base NB 543 (C.I. Solvent Red 49) and 6.00 g of Morton Morplas Magenta 36 (C.I. Solvent Red 172), were stirred in the resulting carder composition for approximately 3 hours at 110° C. and then filtered (Mott filtration apparatus with a No. 3 Whatman filter at 110° C. with 15 psi of nitrogen).

EXAMPLE 3

A phase change ink composition of 1000 grams was prepared as follows: 496.81 g of Kemamide S-180, 126.62 g of Arakawa KE-311 Resin, 38.97 g of Santicizer 278, and 1.90 g of NAUGARD 445 were mixed overnight at 110° C. Then, 311.71 g of Unirez 2970 was added slowly to the mixture at 110° C. Finally, the dyes, 19.99 g of BASF Neptun Red Base NB 543 (C.I. Solvent Red 49) and 4.00 g of Morton Morplas Magenta 36 (C.I. Solvent Red 172), were stirred in the resulting carder composition for approximately 3 hours at 110° C. and then filtered (Molt filtration apparatus with a No. 3 Whatman filter at 110° C. with 15 psi of nitrogen).

The ink compositions were transferred to substrates according to transfer printing methods herein described. The printed inks were aged according to ANSI IT 9-9 1990 (Stability of Color Photographic Images—Methods for Measuring) to determine the long-term likelihood of blooming and the long-term light fastness.

It was experimentally determined that the preferred ink compositions exhibited no blooming whenever the C.I. Solvent Red 172 concentration was kept below 0.7%. The exemplary ink compositions exhibited excellent color saturation, light fastness, and rectilinear transmissivity. These ink compositions exhibited a light-fastness that was superior to the light fastness of an analogous ink composition comprising only the xanthene dye. The nonfluorescent dye had an unexpected quenching effect on the fluorescence of the fluorescent dye, thus permitting the new ink compositions to be easily color matched to existing ink compositions. The exemplary composition were subjected to the abrasion, blocking, compressive yield, viscoelastic, and other DMA tests, and were found to satisfy desired fluidic and mechanical preferred performance ranges as described below.

As previously indicated, the phase change ink formed from the phase change ink carrier composition exhibits excellent physical properties. For example, the subject phase change ink exhibits a high level of lightness, chroma, and rectilinear light transmissivity when utilized in a thin film of substantially uniform thickness, so that color images can be conveyed using overhead projection techniques. Furthermore, the preferred phase change ink compositions exhibit the preferred mechanical and fluidic properties mentioned above when measured by DMA, compressive yield testing and viscometry, and more importantly, work well when used in the indirect printing process previously described. This process is described in greater detail in U.S. patent application Ser. No. U.S. Pat. No. 07/981,646, filed Nov. 25, 1992, now U.S. Pat. No. 5,389,958 and assigned to the assignee of the present invention.

The transmission spectra for each of the preferred phase change ink compositions were evaluated on a commercially available spectrophotometer, the ACS Spectro-Sensor II, according to the measuring methods stipulated in ASTM 1E805 (Standard Practice of Instrumental Methods of Color or Color Difference Measurements of Materials) using the appropriate calibration standards supplied by the instrument manufacturer. For purposes of verifying and quantifying the overall colorimetric performance of the preferred ink compositions, measurement data were reduced, via tristimulus integration, following ASTM E308 (Standard Method for Computing the Colors of Objects using the CIE System) in order to calculate the 1976 CIE L* (Lightness), a* (redness-greenness), and b* (yellowness-blueness) CIELAB values for each phase change ink sample. In addition, the values for CIELAB Psychometric Chroma, $C^*_{ab}$, and CIELAB Psychometric Hue Angle, were calculated according to publication CIE15.2, Colorimetry (Second Edition, Central Bureau de la CIE, Vienna, 1986).

The preferred phase change ink compositions form thin films of substantially uniform thickness that exhibit a relatively high L* value. For example, a substantially uniform thin film of about 10 micron thickness of the phase change ink of this invention preferably has an L* value of at least about 65, more preferably at least about 75, and most preferably at least about 85.

The phase change inks used herein have a relatively high C*ab value when measured as a thin film of substantially uniform thickness. The preferred magenta phase change ink compositions have C*ab values, when applied as substantially uniform thin film of about 10 micron thickness, that preferably is at least about 65.

The respective phase change ink and ink carrier compositions, when transferred to the final substrate in a thin film, are quite durable. One indication of durability is abrasion resistance. For purposes of this invention, abrasion resistance is determined by testing a finished print sample of the phase change ink produced from the carrier composition in a Teledyne Taber Abrader, Model 5130, utilizing CS-230

Abrasion wheels loaded with 500 gram weights. The abrasion wheels are resurfaced after each sample with an S-11 resurfacing disk. Samples printed on paper were tested according to ASTM D406(F84 (Standard Test Method For Abrasion Resistance of Organic Coatings by the Taber Abrader). Samples printed on light transmissive thin films were tested using ASTM D 1304Q-85 (Standard Test Method For Resistance of Transparent Plastics to Surface Abrasion). Print samples were tested as described above, and the results of those tests demonstrated excellent abrasion resistance.

A further test employed to evaluate the durability of phase change inks and ink carrier compositions is an offset transfer or blocking test. This determines whether the phase change ink printed on a substrate will adhere to an adjacent substrate at ambient or elevated temperatures when the printed products are stacked one on top of the other. The blocking test is conducted using an indirect transfer method by printing samples of the phase change ink produced from the carrier composition onto a paper or thin film substrate and placing that substrate in a manila folder under a one pound piece of aluminum, about 8.5 inches wide and about 11 inches long to evenly distribute the weight of a 10 pound block. These printed samples are placed in an oven for 24 hours at a constant temperature of about 60° C. Print samples of the phase change ink of the present invention, subjected to the above described blocking test showed no blocking.

The above-defined DMA properties of the phase change ink compositions were experimentally determined. These dynamic measurements were done on the Rheometrics Solids Analyzer (RSA II) manufactured by Rheometrics, Inc. of Piscataway, New Jersey, using a dual cantilever beam geometry. The dimensions of the sample were about 2.0±1.0 mm thick, about 6.5±0.5 mm wide, about 54.0±1.0 mm long. A time/cure sweep was carried out under a desired force oscillation or testing frequency of about 1 Hz and an auto-strain range of about $1.0 \times 10^{-5}\%$ to about 1%. The temperature range examined was about −60° to about 90° C. The preferred phase change ink compositions typically are (a) ductile or flexible at a temperature of about −10° to about 80° C. and preferably from about 10° to 30° C., (b) have a temperature range for the glassy region from about −100° to 40° C. and preferably from about −40° to about 40° C., the value of E being from about $1.5 \times 10^9$ to $1.5 \times 10^{11}$ dynes/cm$^2$, (c) have a temperature range for the transition region from about −50° to about 60° C., (d) have a temperature range for the rubbery region of E' from about −10° to 100° C., the value of E' being from about $1.0 \times 10^6$ to about $1.0 \times 10^4$ dynes/cm$^2$, and (e) have a temperature range for the terminal region of E' from about 30° to about 160° C. Furthermore, the glass transition temperature range of the phase change ink compositions is from about −40 to about 40° C. The temperature range for integrating under the tan δ peak of the phase change ink composition is from about −80° to about 80° C. with integration values ranging from about 5 to about 40. The temperature range for the peak value of tan δ of the phase change ink is from about −40° to about 40° C. with a tan δ of about $1.0 \times 10^2$ to about $1.0 \times 10$ at peak.

The phase change ink compositions were also analyzed by compressive yield testing. The compressive yield strength measurements were done on an MTS SINTECH 2/D mechanical tester manufactured by MTS Sintech, Inc. of Cary, N.C. using small cylindrical sample blocks. The dimensions of a typical sample are about 19.0±1.0 mm X about 19.0±1.0 mm. Isothermal yield stress was measured as a function of temperature (about 25° to about 80° C.) and strain rate. The material was deformed up to about 40%.

The preferred yield stresses as a function of temperature for suitable phase change ink compositions in the indirect printing process of the present invention are described by an equation as follows:

$$YS = mT + I$$

wherein YS, which is a function of temperature, is the yield stress, m is the slope, T is the temperature, and I is the intercept.

Under non-process conditions, i.e., after the final printed product is formed or conditions under which the ink sticks are stored, and the ink is in a ductile state or condition at a temperature range of from at least about 10° to about 60° C., the preferred yield stress values are described by m as being from about −9±−2 psi/° C. to about −36±−2 psi/° C. and I as being from about 800±100 psi to about 2200±100 psi. More preferably, m is about −30±2/psi/° C. and I is about 1700±100 psi. Under process conditions, i.e., during the indirect printing of the ink from an intermediate transfer surface onto a substrate while the ink is in a malleable solid condition or state, at a temperature of from at least about 30° C. to about 80° C., the preferred stress values are described by m as being from about −6±−2 psi/° C. to about −36±−2 psi/° C. and I as being from about 800±100 psi to about 1600±100 psi. More preferably, m is about −9±2 psi/° C. and I is about 950±100 psi.

The ink utilized in the process and system of the instant invention is preferably initially in solid form and is then changed to a molten state by the application of heat energy to raise the temperature from about 85° C. to about 150° C. Elevated temperatures above this range will cause degradation or chemical breakdown of the ink. The molten ink is then applied in raster fashion from the ink jets in the printhead to the exposed surface of the liquid layer forming the intermediate transfer surface, where it is cooled to an intermediate temperature and solidifies to a malleable state in which it is transferred to the final receiving surface via a contact transfer by entering the nip between the pressure and fusing roller and the liquid layer forming the intermediate transfer surface on the support surface or drum. This intermediate temperature where the solidified ink is maintained at its malleable state is between about 30° C. to about 80° C.

Once the solid malleable ink image enters the nip, it is deformed to its final image conformation and adheres or is fixed to the final receiving substrate either by the pressure exerted against ink image on the final receiving substrate by the pressure and fusing roller alone, or by the combination of the pressure and heat supplied by appropriate heating apparatus. Additional heating apparatus could optionally be employed to supply heat to facilitate the process at this point. The pressure exerted on the ink image is between about 10 to about 2000 pounds per square inch (psi), more preferably between about 500 to about 1000 psi, and most preferably between about 750 to about 850 psi. The pressure must be sufficient to have the ink image adhere to the final receiving substrate and be sufficiently deformed to ensure that light is transmitted through the ink image rectilinearly or without significant deviation in its path from the inlet to the outlet, in those instances when the final receiving substrate is a transparency. Once adhered to the final receiving substrate, the ink image is cooled to ambient temperature of about 20° to about 25° C. The ink comprising the ink image must be ductile, or be able to yield or experience plastic deformation without fracture when kept above the glass transition temperature. Below the glass transition temperature the ink is brittle. The temperature of the ink image in the ductile state is between about −10° C. and to about the melting point, or less than about 85° C.

It will be obvious to those having skill in the art that various changes may be made in the details of the above-described embodiment of the present invention without departing from the underlying principles thereof. The scope of the present invention should, therefore, be determined only by the following claims.

We claim:

1. A nonaqueous phase change ink composition comprising:

a nonaqueous carrier composition; and at least two compatible dyes of different dye types including at least a fluorescent dye and a nonfluorescent dye.

2. The ink composition of claim 1 in which the fluorescent dye comprises a xanthene dye and the nonfluorescent dye comprises an anthraquinone dye.

3. The ink composition of claim 2 in which the xanthene dye comprises a rhodamine dye.

4. The ink composition of claim 3 in which the rhodamine comprises C.I. Solvent Red 49 dye and the anthraquinone dye comprises C.I. Solvent Red 172 dye.

5. The ink composition of claim 1 having a magenta hue.

6. The ink composition of claim 1 having a nonfluorescent chroma that facilitates color matching with compatible subtractive primary color dyes.

7. The ink composition of claim 1 exhibiting a light fastness greater than an analogous ink composition comprising only the fluorescent dye.

8. The ink composition of claim 4 comprising less than 0.7 weight percent of C.I. Solvent Red 172 dye.

9. The ink composition of claim 4 comprising 1–5 weight percent of C.I. Solvent Red 49 dye.

10. The ink composition of claim 9 comprising 1.0–2.5 weight percent of C.I. Solvent Red 49.

11. The ink composition of claim 4 in which the carder composition comprises from about 10 to about 50 weight percent of a tetra-amide compound, from about 30 to about 80 weight percent of a mono-amide compound, from about 0 to about 40 weight percent of a tackifier, from about 0 to about 30 weight percent of a plasticizer, and about 0 to about 2 percent of an antioxidant.

12. The ink composition of claim 5, wherein a substantially uniform thin film of about 10 micron thickness of the phase change ink composition has a $C^*_{ab}$ value of at least about 65.

13. The ink composition of claim 1, wherein under nonprocess conditions the phase change ink composition has a yield stress value (YS), according to the equation $YS=mT+I$, comprising a value wherein m is from about $-9\pm-2$ psi/° C. to about $-36\pm-2$ psi/° C.; T is from about 10° to 60° C.; and I is from about 800 psi±100 psi to 2200 psi±100 psi, prior to raising the temperature of the phase change ink composition to a first elevated operating temperature or subsequent to forming a printed substrate.

14. The ink composition of claim 1, wherein said phase change ink composition is ductile at a temperature of about 10 to about 30° C.

15. The ink composition of claim 1, wherein the phase change ink composition has a temperature range for the transition region of E' from about −50° to 60° C.

16. The ink composition of claim 1, wherein the phase change ink composition has a temperature range for the rubbery region of E' from about −10° to about 100° C., the value of E' being from about $1.0\times10^6$ to about $1.0\times10^{11}$ dynes/cm$^2$ at a desired testing frequency.

17. The ink composition of claim 1, wherein the phase change ink composition has a temperature range for a terminal region of E' from about 30° to about 160° C.

18. The ink composition of claim 1, wherein the ink composition forms thin films of uniform thickness that are rectilinearly light transmissive.

19. The ink composition of claim 1, wherein the phase change ink composition has a glass transition temperature range from about −40° to about 40° C.

20. The ink composition of claim 2, wherein a substantially uniform thin film of about 10 micron thickness of the phase change ink composition has an L* value of at least about 65.

21. A method for increasing the dye load of a phase change ink to enhance the color intensity of printed ultra thin films of the phase change ink, comprising:

substantially saturating an ink carrier composition with a nonfluorescent dye, the ink carrier composition having desirable mechanical and fluidic characteristics, wherein the dye has insufficient solubility in the ink carrier composition to form printed ink films of less than or equal to about 10 micron thickness having desirable printed color intensity; and adding a fluorescent dye to form a phase change ink composition suitable for printing ink films of less than or equal to about 10 micron thickness having desirable printed color intensity, wherein the mechanical and fluidic characteristics are preserved.

22. A method for quenching the fluorescence of nonaqueous phase change ink composition including a normally fluorescent dye, comprising:

mixing a normally fluorescent dye into an ink carrier composition having desirable mechanical and fluidic characteristics to form a phase change ink composition having a predetermined color intensity; and adding a nonfluorescent dye in sufficient concentration to substantially quench the fluorescence of the fluorescent dye in the phase change ink composition while preserving the desirable mechanical and fluidic characteristics of the phase change ink composition and enhancing its color matching ability.

23. The ink composition of claim 1 in which at least one of the dyes is a xanthene dye.

24. The ink composition of claim 1 comprising a greater weight percent of fluorescent dye than nonfluorescent dye.

* * * * *